US012107365B2

(12) United States Patent
Miedl et al.

(10) Patent No.: US 12,107,365 B2
(45) Date of Patent: Oct. 1, 2024

(54) PREFABRICATED ELECTRIC CABLE, PLUG CONNECTOR ASSEMBLY, AND METHOD AND APPARATUS FOR MANUFACTURING AN ELECTRIC CABLE

(71) Applicant: Rosenberger Hochfrequenztechnik Gmbh & Co. KG, Fridolfing (DE)

(72) Inventors: Thomas Miedl, Tittmoning (DE); Till Bredbeck, Siegsdorf (DE); Johannes Schmid, Altoetting (DE)

(73) Assignee: Rosenberger Hochfrequenztechnik GmbH & Co KG, Fridolfing (DE)

( * ) Notice: Subject to any disclaimer, the term of this patent is extended or adjusted under 35 U.S.C. 154(b) by 0 days.

(21) Appl. No.: 17/599,145

(22) PCT Filed: Apr. 2, 2020

(86) PCT No.: PCT/EP2020/059402

§ 371 (c)(1),
(2) Date: Sep. 28, 2021

(87) PCT Pub. No.: WO2020/201423

PCT Pub. Date: Oct. 8, 2020

(65) Prior Publication Data

US 2022/0173547 A1 Jun. 2, 2022

(30) Foreign Application Priority Data

Apr. 4, 2019 (DE) .................... 10 2019 108 886.0

(51) Int. Cl.
*H01R 13/58* (2006.01)
*H01R 4/18* (2006.01)

(52) U.S. Cl.
CPC ......... *H01R 13/5808* (2013.01); *H01R 4/183* (2013.01)

(58) Field of Classification Search
None
See application file for complete search history.

(56) References Cited

U.S. PATENT DOCUMENTS

| | | | | |
|---|---|---|---|---|
| 3,441,659 A * | 4/1969 | Clair | H01R 4/20 | 439/879 |
| 4,613,199 A | 9/1986 | McGeary | | |
| 4,990,105 A | 2/1991 | Karlovich | | |
| 5,059,139 A * | 10/1991 | Spinner | H01R 9/0521 | 439/578 |
| 5,468,911 A * | 11/1995 | Leve | H01R 4/20 | 439/867 |
| 6,530,789 B2 * | 3/2003 | Konda | H01R 9/0518 | 439/98 |

(Continued)

FOREIGN PATENT DOCUMENTS

| | | | |
|---|---|---|---|
| DE | 10 2004 025 511 A1 | 12/2005 | |
| DE | 102004024792 A1 | 12/2006 | |

(Continued)

*Primary Examiner* — Ross N Gushi
(74) *Attorney, Agent, or Firm* — Donald S. Showalter, Esq.; GrayRobinson, P.A.

(57) ABSTRACT

Embodiments of a prefabricated electric cable may have an outer conductor shield and a support sleeve which is fastened to the outer conductor shield. The support sleeve has a cable-side end and a portion of the support sleeve tapers in an axial direction oriented toward the cable-side end.

13 Claims, 7 Drawing Sheets

(56) References Cited

U.S. PATENT DOCUMENTS

| | | | | |
|---|---|---|---|---|
| 7,268,297 | B2 * | 9/2007 | Jeong | H01R 4/489<br>174/75 C |
| 7,632,147 | B2 * | 12/2009 | Farahani | H01R 13/65912<br>439/387 |
| 2003/0003805 | A1 | 1/2003 | Yamamoto | |
| 2010/0000788 | A1 | 1/2010 | Kawase | |

FOREIGN PATENT DOCUMENTS

| | | | |
|---|---|---|---|
| DE | 10 2016 122728 | A1 | 5/2018 |
| EP | 2456013 | A2 | 5/2012 |
| EP | 3242359 | A1 | 8/2017 |
| EP | 3220483 | A1 | 9/2017 |
| EP | 3429029 | A1 | 1/2019 |
| JP | H11 121 052 | A | 4/1999 |

* cited by examiner

PREFABRICATED ELECTRIC CABLE, PLUG CONNECTOR ASSEMBLY, AND METHOD AND APPARATUS FOR MANUFACTURING AN ELECTRIC CABLE

CROSS REFERENCE TO RELATED APPLICATIONS

This is a U.S. National Phase Entry under 35 U.S.C. § 371 of International Application No. PCT/EP2020/059402 filed Apr. 2, 2020 entitled: PREFABRICATED ELECTRIC CABLE, PLUG CONNECTOR ASSEMBLY, AND METHOD AND APPARATUS FOR MANUFACTURING AN ELECTRIC CABLE which designates the United States and at least one other country in addition to the United States and claims priority to German Patent Application no. 10 2019 108 886.0 filed Apr. 4, 2019.

INCORPORATION BY REFERENCE

International Application No. PCT/EP2020/059402 and German Application No. 10 2019 108 866.0 are each expressly incorporated herein by reference in their entireties to form part of the present disclosure.

STATEMENT REGARDING FEDERALLY-SPONSORED RESEARCH OR DEVELOPMENT

Not applicable.

FIELD OF THE INVENTION

The invention relates to the field of electrical cables, more particularly, one aspect of the invention relates to a prefabricated electric cable, having an outer conductor shield and a support sleeve attached to the outer conductor shield.

Another aspect of the invention relates a prefabricated electrical cable in which the support sleeve is formed by punching and bending before being attached to the outer conductor shield.

Another aspect of the invention relates to a connector arrangement, comprising an electric cable and an electrical connector, connected to at least one cable end.

The invention also relates to a method for fabricating an electric cable, according to which a support sleeve having a connector-side end and a cable-side end is attached to an outer conductor shield of an electric cable.

The invention moreover relates to an apparatus for fabricating an electric cable, having a sensor device, a deforming tool which can be positioned axially and a control device.

BACKGROUND

When fabricating cables, the conductors thereof are typically connected to a connector in order to then be able to form electrical connections with other cables or conductors which have corresponding connectors or mating connectors. A connector or mating connector can be a plug, a panel plug, a socket, a coupling or an adapter. The term "connector" or "mating connector" used within the context of the invention represents all variants.

In cable fabrication, a mechanically and electrically optimized connection between the electric cable, which is prefabricated with a support sleeve, and an electrical connector should be realized.

In particular, connectors for the automotive industry or for vehicles are subject to high demands in terms of their robustness and the safety of the plug connections. In this regard, a plug connection sometimes needs to withstand high loads, for example mechanical loads, and to remain closed in a defined manner so that the electrical connection does not accidentally become disconnected, for example during the operation of a vehicle. Ensuring safety is particularly paramount during autonomous operation of vehicles and for vehicle assistance systems.

In particular, in mechanical terms, a stable and vibration-proof connection between the electric cable and the electrical connector should be realized, in particular without "jiggling". To this end, a corresponding connection between the support sleeve and an outer conductor part, attached to the support sleeve, of the electrical connector (referred to below as "outer conductor element" or "outer conductor assembly") should be realized.

During autonomous operation of a vehicle or when using assistance systems, high quantities of data from multiple cameras, diverse sensors and navigation sources sometimes need to be combined and transported together, usually in real time. The operation of many devices, screens and cameras accordingly requires a powerful infrastructure in the vehicle electronics. Accordingly, the demands on the connectors and the cable connections within a vehicle in terms of the required data rate are now also very high. At the same time, to save on installation space and weight, it is important to form the connector as compactly as possible.

For this reason, in electrical terms, particular attention should be paid to an impedance-matched transfer between the electric cable and the electrical connector (or between the support sleeve and the outer conductor element of the electrical connector). It is particularly important to avoid geometric discontinuities.

To meet the demands, it is generally necessary for the prefabricated electric cable with the support sleeve attached to the cable to be positioned precisely with respect to the outer conductor contact of the connector, or with respect to the outer conductor element of the connector, in the axial direction. This is not currently achieved to a satisfactory extent, in particular when fabricating cables for use in high-frequency technology, or it is only possible to a limited extent and in a very complex manner.

BRIEF SUMMARY OF THE INVENTION

In consideration of the known prior art, the object of the present invention consists in providing a prefabricated electric cable and a connector arrangement in which the attachment of an outer conductor element to a support sleeve attached to the cable is improved in mechanical and electrical terms.

The present invention is based on the object of providing an advantageous use of a punched and bent part which is preformed to produce a support sleeve.

Finally, it is also an object of the invention to provide a method and an apparatus for fabricating an electric cable, in which the mounting of an outer conductor element on a support sleeve attached to the cable is improved.

A prefabricated electric cable is provided, having an outer conductor shield and a support sleeve attached to the outer conductor shield, wherein the support sleeve has a connector-side end and a cable-side end.

Within the context of the invention, essentially any electric cable can be provided, which has any number of inner conductors or cable wires. By way of example, an electric cable within the context of the invention can have one inner conductor, two inner conductors, three inner conductors, four inner conductors or even more inner conductors. An electric cable with two inner conductors is preferably provided.

If an electric cable with only one inner conductor is provided, this can be designed as a coaxial cable. If an electric cable with more than one inner conductor is provided, the inner conductors of the cable can be twisted in the manner of a "twisted pair" cable; the inner conductors can, however, be routed parallel, for example in the case of a "parallel pair" cable.

The outer conductor shield can be, in particular, an outer conductor shielding braid comprising mutually intertwined strands.

Within the context of the invention, the connector-side end of the support sleeve is understood to be the axial end of the support sleeve which faces the free cable end to be processed during fabrication. The connector-side end of the support sleeve preferably faces an opening of the electrical connector which is to be attached to the electric cable during the cable fabrication, which opening is provided for inserting a future mating connector.

The cable-side end is the end remote from the connector-side end of the support sleeve in the axial direction. The support sleeve therefore extends between the connector-side end and the cable-side end in the axial direction along its longitudinal axis or center axis.

According to the invention, it is provided that the support sleeve, in a cable-side end portion, tapers in the direction of the cable-side end.

The cable-side end portion preferably extends in the axial direction and directly adjoins the cable-side end.

It is preferably provided that the taper extends directly as far as the cable-side end of the support sleeve. Starting directly from the cable-side end, the diameter of the support sleeve can therefore increase along the cable-side end portion (for example linearly or conically or even in a curve) in the direction of the connector-side end.

Starting directly from the cable-side end, an axial portion with a constant diameter is preferably not provided.

It can preferably be provided that the support sleeve tapers, preferably tapers constantly, along the entire cable-side end portion (and not only along an axial subregion of the cable-side end portion).

The taper in the cable-side end portion is preferably not a chamfer, a transition ratio or a beveled edge of the support sleeve.

In addition to the cable-side end portion, the support sleeve preferably has further portions, in particular a connector-side end portion, which extends in the axial direction starting from the connector-side end of the support sleeve. A central portion, extending between the connector-side end portion and the cable-side end portion, can possibly also be provided. However, the connector-side end portion can also directly adjoin the cable-side end portion.

The support sleeve can preferably consist exclusively of the cable-side end portion. The support sleeve can also consist exclusively of the cable-side end portion and the central portion. The support sleeve can also consist exclusively of the cable-side end portion and the connector-side end portion. The support sleeve can also consist exclusively of the cable-side end portion, the central portion and the connector-side end portion.

The cable-side end portion preferably tapers conically in the direction of the cable-side end.

The inventive taper of the support sleeve in the cable-side end portion can, in particular, improve the axial positioning of the support sleeve on the electric cable and/or the axial positioning of the support sleeve within a component or an assembly of an electrical connector to be applied during fabrication, for example the outer conductor element described below. The axial positioning of the support sleeve can thus take place with good process reliability.

The inventive use of a tapering cable-side end portion can improve the mechanical and electrical connection between the support sleeve and the electric cable and/or the future connector. In particular, assembly-related tolerances of components or assemblies can be compensated.

In an advantageous development of the invention, it can be provided that the cable-side end portion of the support sleeve is designed in such a way that it is deformable by a deforming process, preferably a crimping process, in such a way that the cable-side end portion tapers in the direction of the cable-side end.

The taper of the cable-side end portion can preferably be firstly generated or reinforced during the deformation (in particular swaging or crimping) of the support sleeve on the electric cable and/or during the crimping of a component or an assembly of the future electrical connector to the support sleeve. In particular, the taper can be generated in part or completely during the crimping or swaging to the outer conductor element (described below) to the support sleeve.

To form the tapering cable-side end portion, at least one opening (recess), preferably two openings, can be provided in the region of the cable-side end portion.

The opening(s) can be designed to be notch-like. Slot-like openings, similar to those of a spring cage, are also possible.

According to a further development, it can be provided that the cable-side end portion of the support sleeve has an incision, preferably two incisions or more incisions, which, starting from the cable-side end, extend in the axial direction through the cable-side end portion.

Groups of opposing incisions along the circumference of the support sleeve can preferably be provided.

Incisions can preferably be provided in the manner of notches.

By way of example, by using one or more incisions, the taper in the cable-side end portion can be firstly generated during the attachment of the support sleeve to the cable or during the attachment of a further component of the electrical connector to the support sleeve by a deforming process, in particular by a crimping process.

According to a development of the invention, it can be provided that the cable-side end portion of the support sleeve is designed as a deformation region, in particular crimp region, for attaching the support sleeve to the outer conductor shield.

It can also be provided that the cable-side end portion of the support sleeve is designed as a deformation region, in particular crimp region, for attaching a component or an assembly of an electrical connector, for example the outer conductor element, to the support sleeve.

In a development of the invention, it can be provided that the cable-side end portion of the support sleeve, in particular the tapering axial region of the cable-side end portion, extends over an axial length which corresponds to at least five percent (5%) of the total length of the support sleeve, preferably corresponds to at least ten percent (10%) of the total length of the support sleeve, particularly preferably corresponds to at least twenty percent (20%) of the total length of the support sleeve, especially preferably corresponds to at least forty percent (40%) of the total length of the support sleeve, further preferably corresponds to at least fifty percent (50%) of the total length of the support sleeve and even further preferably corresponds to at least sixty percent (60%) of the total length of the support sleeve.

The cable-side end portion, which tapers in the direction of the cable-side end, is preferably not a beveled surface of an edge of the support sleeve and not a chamfer.

In a development of the invention, it can be provided that the cable-side end portion of the support sleeve tapers in the direction of the cable-side end in such a way that the cable-side end has a circular cross-section.

The cable-side end can alternatively also have another cross-sectional profile, for example an oval profile, an elliptical profile or the like.

However, a circular crimp is preferably provided in order to thereby realize a conical region with a circular cross-sectional profile at the cable-side end.

In an advantageous development of the invention, it can be provided that the support sleeve, adjacent to the connector-side end, forms at least one end face which can be used as a stop.

The at least one end face can, in particular, be formed as a stop for the support sleeve in a further component of the electrical connector, in particular the outer conductor element, described below, of the electrical connector.

The use of a stop can improve the axial positioning of the support sleeve on the electric cable and/or in a component or an assembly, for example the outer conductor element of the electrical connector.

In a preferred embodiment of the invention, the support sleeve is designed to assume a form-fitting connection with an outer conductor element of an electrical connector. The following measures can be provided to create the form fit:

1. axially supporting the support sleeve with its connector-side end face, which can be used as a stop, on a radially inwardly directed stop region formed on the inner wall of the outer conductor element; and
2. supporting the cable-side end portion of the support sleeve in a narrowing of the outer conductor element of the connector, which narrowing is formed by a crimping process.

In particular, a clearance-free axial fastening between the stop region of the outer conductor element and the support sleeve, with optimized electrical properties, can thus be provided.

In a development of the invention, it can be provided that the support sleeve, in a connector-side end portion, tapers in the direction of the connector-side end.

The preceding and following features which relate to the cable-side end portion can also be understood in relation to the connector-side end portion, and vice versa.

In particular, it can be provided that the taper extends directly as far as the connector-side end of the support sleeve. Starting directly from the connector-side end, the diameter of the support sleeve can therefore increase along the connector-side end portion (for example linearly or conically or even in a curve) in the direction of the cable-side end.

Starting directly from the connector-side end, an axial portion with a constant diameter is preferably not provided.

It can preferably be provided that the support sleeve tapers, preferably tapers constantly, along the entire connector-side end portion (and not only along an axial subregion of the connector-side end portion).

The taper in the connector-side end portion is preferably not a chamfer, a transition ratio or a beveled edge of the support sleeve.

The use of a connector-side end portion which tapers in the direction of the connector-side end in addition to the tapering cable-side end portion can be advantageous for improving the axial positioning of the support sleeve on the electric cable and/or in a component or an assembly, for example the outer conductor element, of an electrical connector.

A connector-side end portion which tapers in the direction of the connector-side end can preferably be provided alternatively—but optionally also in addition—to a stop of the support sleeve which adjoins the connector-side end.

In an advantageous development of the invention, it can be provided that the outer conductor shield is folded back over the support sleeve.

In particular, a portion of the outer conductor shield which emerges from the connector-side end of the support sleeve in the direction of the front, free end of the cable can be folded backwards over the support sleeve. The folded-back shield or the outer conductor shield preferably extends axially beyond the length of the support sleeve or beyond the cable-side end of the support sleeve.

According to the invention, owing to the tapering cable-side end portion, the adhesion and therefore the strain relief and electrical connection of the outer conductor shield between the support sleeve and a component pushed onto the support sleeve, or an assembly, in particular the outer conductor element of the connector, can be improved.

In an advantageous development of the invention, it can be provided that the support sleeve has two support regions. A first support region can be provided, which is arranged adjacent to the connector-side end and has two half shells, which are substantially U-shaped in cross-section and are arranged with their openings opposite one another. Furthermore, a second support region can be provided, which is formed adjacent to the cable-side end and has a circular or oval cross-section.

A support sleeve with two support regions can be particularly advantageous if an electric cable with multiple wires or inner conductors, for example two inner conductors, is provided. The contour of the first support region can therefore be matched in particular to the contour or to the cross-section of the adjacently arranged inner conductors of the electric cable, whereby the mechanical holding force can be improved. On the other hand, to improve the mechanical and electrical connection between the support sleeve and a component or an assembly, in particular the outer conductor element of the connector, with a generally circular cross-section, the second support region with a preferably (substantially) circular cross-section can be advantageous.

The first support region and the second support region can preferably be connected to one another by a web, preferably by two webs, extending in the axial direction.

In an advantageous development of the invention, it can be provided that the prefabricated electric cable has an outer conductor element of an electrical connector which is attached, preferably crimped, to the support sleeve.

The outer conductor element can be formed in one part or in multiple parts. The outer conductor element can also be referred to as an outer conductor assembly, in particular if the outer conductor element is formed in multiple parts.

The support sleeve which is improved according to the invention can be particularly suitable for attachment in an outer conductor element or in an outer conductor assembly of the future connector.

It can be provided that the support sleeve, the outer conductor shield and/or the outer conductor element or the outer conductor assembly are crimped or swaged to one another in the first support region and/or in the second support region. Only the support sleeve and the outer conductor sleeve are preferably crimped or swaged to one another in the first support region. The support sleeve, outer conductor shield and outer conductor element or outer conductor assembly are preferably jointly crimped or swaged to one another in the second support region.

In a development of the invention, it can be provided that the outer conductor element forms at least one stop region for the at least one end-face stop of the support sleeve, preferably an internal shoulder or at least one web projecting into the interior of the outer conductor element.

The support sleeve can therefore be advantageously pushed into the outer conductor element in the axial direction until it reaches the stop region.

According to a development of the invention, it can be provided that the outer conductor element has at least one deformation region, in particular a crimp region, for swaging or crimping the outer conductor element to the cable-side end portion and/or to the connector-side end portion of the support sleeve.

In particular, swaging or crimping the outer conductor element in an axial region which (when the support sleeve is pushed axially as far as its end position in the outer conductor element) is located in the region of the cable-side end portion or the connector-side end portion of the support sleeve can result in a mechanically and electrically stable and impedance-matched connection.

As a result of the cooperation between the outer conductor element and the tapering cable-side end portion of the support sleeve during the swaging or crimping of the components, an axially clearance-free fastening of the support sleeve in the outer conductor element can ultimately take place. The support sleeve can be axially supported on the stop region on the one hand and in the region of the taper on the other.

Owing to the conical or tapering form of the cable-side end portion in conjunction with the deformation region of the outer conductor element, it is possible that, during the deformation processes, the support sleeve can be displaced further in the direction of the stop region or the internal shoulder of the outer conductor element and even better swaging can take place.

It can be provided that the support sleeve, in particular in the second support region, has an indentation, which is designed to follow the contour of the outer conductor shield in the axial direction.

The invention therefore also relates to a connector arrangement, comprising an electric cable and an electrical connector connected to at least one cable end. The connector arrangement (in particular the electrical connector) has a support sleeve, which is attached to an outer conductor shield of the electric cable and has a connector-side end and a cable-side end, and an outer conductor element attached to the support sleeve. It is provided that the support sleeve, in a cable-side end portion, tapers in the direction of the cable-side end.

The outer conductor shield is preferably folded backwards over the support sleeve and preferably clamped between the narrowing of the outer conductor element and at least the cable-side end portion of the support sleeve.

The electrical connector is not restricted to a specific connector type, wherein the invention is particularly suitable for connectors and plug connections for high frequency technology. This can refer in particular to connectors or plug connections of the type: PL, BNC, TNC, SMBA (FAKRA), SMA, SMB, SMS, SMC, SMP, BMS, HFM (FAKRA mini), H-MTD, BMK, mini coax or Makax. The electrical connector is particularly preferably designed as an H-MTD connector.

The inventive connector can be particularly advantageously used within a vehicle, in particular a motor vehicle. Possible areas of use are autonomous driving, driver assistance systems, navigation systems, infotainment systems, rear entertainment systems, internet connections and wireless gigabit (IEEE 802.11ad standard). Possible applications relate to high-resolution cameras, for example 4K and 8K cameras, sensor systems, onboard computers, high-resolution screens, high-resolution dashboards, 3D navigation devices and mobile radio devices.

In this case, the term “vehicle” describes any means of transportation, in particular land vehicles, water vehicles or aircraft, also including spacecraft.

However, the inventive connector is suitable for any applications within electrical engineering as a whole and should not be seen as restricted to use in automotive engineering.

The invention moreover relates to the advantageous use of a punched and bent part, preformed to produce a support sleeve, for attachment to an outer conductor shield of an electric cable, wherein the punched and bent part is designed in such a way that the support sleeve forms a connector-side end and a cable-side end. It is provided that the support sleeve, in a cable-side end portion, tapers in the direction of the cable side end.

Owing to the taper in the cable-side end portion, a clearance between the support sleeve and an outer conductor element of an electrical connector can, in particular, be prevented.

The punched and bent part, preformed to produce the support sleeve, can particularly preferably be provided for fabricating an electric cable with a connector for use in high frequency technology.

The invention moreover relates to a method for fabricating an electric cable, according to which a support sleeve having a connector-side end and a cable-side end is attached to an outer conductor shield of an electric cable, according to which the outer conductor shield is folded back over the support sleeve, and according to which an outer conductor element or an outer conductor assembly of an electrical connector is pushed axially over the support sleeve and swaged or crimped to the support sleeve. It is provided that the outer conductor element is swaged or crimped to the support sleeve, at least in the region of a cable-side end portion which tapers in the direction of the cable-side end of the support sleeve.

The support sleeve is preferably inserted into the outer conductor element in such a way that air pockets and resultant electrical faults are reduced.

The cable can be pushed into the outer conductor element until it strikes the support sleeve at a stop region and it can then be swaged or crimped to the outer conductor element in the region of the tapering cable-side end portion.

The maximum deformation force (or crimp force) can preferably be applied in the region of the cable-side end portion of the support sleeve by a deforming tool (in particular crimping tool), which should be aligned according to the position of the cable-side end portion.

It can be provided that the tapering cable-side end portion is formed from an originally sleeve-shaped support sleeve in that the support sleeve is conically deformed during the crimping of the outer conductor element to the support sleeve.

The support sleeve can be produced from a punched and bent part as part of the method.

The punched and bent part can be pre-deformed to produce the support sleeve before the attachment to the outer conductor of the electric cable.

It can be provided that the punched and bent part is provided with an incision, preferably two incisions or more incisions, which, starting from the future cable-side end of the support sleeve, extend in the axial direction through the cable-side end portion of the future support sleeve.

Any further method steps for fabricating the electric cable can be provided as part of the inventive method and can be carried out before, between or after the already mentioned method steps.

By way of example, it can be provided that a cable sheath of the electric cable is firstly stripped in the region of the cable end to be processed and the separated cable sheath piece is removed from the electric cable. The inventive support sleeve can them be attached, preferably crimped or swaged, to the exposed outer conductor shield of the electric cable.

After the outer conductor shield has been placed over the support sleeve, a possibly present cable foil and an optionally present dielectric filling material can be stripped and removed from the electric cable in order to expose the individual inner conductors or cable wires which are generally still separately insulated at this time.

A respective cable insulation can subsequently be removed and the ends of the cable wires exposed. An inner conductor part of the connector can then be connected, for example crimped or swaged, to the cable wires or inner conductors of the cable in each case.

The cable can then be pushed into the outer conductor element as far as an intended axial end position during the further cable fabrication. The intended end position can be specified, for example, by a stop region within the outer conductor element, for example an internal shoulder or at least one web projecting into the interior of the outer conductor element. A tapering region within the outer conductor element can also be provided, which corresponds to a tapering connector-side or cable-side end portion of the support sleeve.

The axial position of the support sleeve within the outer conductor element can possibly be additionally detected by means of a sensor device in order to determine the position of a deforming tool (in particular a crimping tool) for attaching the outer conductor element to the support sleeve.

After the attachment, preferably the crimping or swaging, of the outer conductor element to the support sleeve, the electric cable which has been prefabricated up to this point can be inserted into a plastic housing of the electric connector until the outer conductor element reaches a specified axial end position in the plastic housing and, for example, latches in a primary securing means or primary latching means. A secondary securing means can then be optionally latched.

The above method sequence should be seen as merely exemplary. It is possible to vary or add to the sequence of the respective method steps.

The invention furthermore relates to an apparatus for fabricating an electric cable. The apparatus has a sensor device for detecting the axial position of a support sleeve arranged within an outer conductor element of an electrical connector and attached to an outer conductor shield of the electric cable. The apparatus furthermore has a deforming tool (in particular a crimping tool) which can be positioned axially and a control device for determining an intended axial deforming position (or crimping position) for the deforming tool (or crimping tool). The control device is configured to determine the deforming position (or crimping position) based on the axial position of the support sleeve, detected by means of the sensor device, in such a way that the outer conductor element can be crimped to the support sleeve by means of the deforming tool (or by means of the crimping tool), at least in the region of a cable-side end portion which tapers in the direction of the cable-side end of the support sleeve.

The axial position of the support sleeve within the outer conductor element can be determined by the sensor device taking into account the axial position of the outer conductor element. In particular, if the outer conductor element has a stop region for the support sleeve, the relative axial position of the support sleeve within the outer conductor element can be already known. The absolute axial position, for example within the apparatus, can then possibly be simply calculated by the sensor device.

The sensor device can also have more or more sensors for detecting the axial position of the support sleeve within the outer conductor element.

By using the inventive apparatus, a mechanically stable form fit between the outer conductor element and the support sleeve can advantageously take place without influencing the impedance.

The invention also relates to a computer program product with program code means for carrying out a method for fabricating an electric cable (in particular according to the preceding and following embodiments) when the program is executed on a control device of an apparatus for fabricating an electric cable (in particular according to the preceding and following embodiments).

The control device can be designed as a microprocessor. Instead of a microprocessor, any further device for implementing the control device can also be provided, for example one or more arrangements of discrete electrical components on a printed circuit board, a programmable logic controller (PLC), an application-specific integrated circuit (ASIC) or other programmable circuit, for example also a field programmable gate array (FPGA), a programmable logic arrangement (PLA) and/or a commercially available computer.

The solution illustrated below represents an invention which is independent of the solution of claim 1 but which can also be implemented in combination with claim 1.

The independent invention relates to an electric cable which can be connected to a connector at one end, wherein the cable has at least two wires, an outer conductor shield, at least one insulation means, which is formed between the wires and the outer conductor shield, and a support sleeve, which is formed at the end of the electric cable. The support sleeve has a first support region with an oblong cross-section and a second support region with a substantially circular cross-section.

"Oblong" within the context of the independent invention is understood to mean that an extent in a first direction is greater than an extent in a second direction, wherein the second direction extends perpendicularly to the first direction.

A substantially circular cross-section can also refer to circular cross-sections which have indentations in the axial direction.

Oblong cross-sections can be designed, for example, to be substantially slot-shaped, according to which short sides are formed by semicircles and the long sides connect the short sides, However, this does not prevent the long sides from being able to have indentations or interruptions.

Advantageous embodiments and developments of the independent invention are revealed in the embodiments, developments and disclosed individual features relating to the prefabricated electric cable, the connector arrangement, the use, the method for fabrication and the apparatus for fabrication.

It should furthermore be mentioned that features which have been described in association with the prefabricated electric cable can, of course, also be advantageously applied to the inventive connector arrangement, the use, the method and the apparatus, and vice versa. Advantages which have already been mentioned in association with the prefabricated electric cable can also furthermore be understood in relation to the inventive connector arrangement, the use, the method and the apparatus, and vice versa.

In addition, it should furthermore be pointed out that terms such as “comprising”, “having” or “with” do not exclude other features or steps. Furthermore, terms such as “a” or “the”, which point to steps or features in the singular, do not exclude multiple features or steps, and vice versa.

However, in a puristic embodiment of the invention, it can also be provided that the features introduced into the invention by the terms “comprising”, “having” or “with” are listed exhaustively. Accordingly, one or more lists can be considered exhaustive within the context of the invention, for example considered respectively for each claim.

It should furthermore be emphasized that the values and parameters described here include deviations or fluctuations of plus or minus ten percent (±10%) or less, preferably plus or minus five percent (±5%) or less, further preferably plus or minus one percent (±1%) or less and especially preferably plus or minus one tenth of one percent (±0.1%) or less of the value or parameter mentioned in each case, provided these deviations are not ruled out in practice when implementing the invention. The specification of ranges by start and end values also includes all those values and fractions which are included by the range mentioned in each case, in particular the start and end values and a respective median value.

Exemplary embodiments of the invention are described in more detail below with reference to the drawing.

The Figures each show preferred exemplary embodiments in which individual features of the present invention are illustrated in combination with one another. Features of an exemplary embodiment can also be implemented separately from the other features of the same exemplary embodiment and can accordingly be readily combined with features of other exemplary embodiments by a person skilled in the art to give further useful combinations and sub-combinations.

In the Figures, functionally identical elements are denoted by the same reference signs.

BRIEF DESCRIPTION OF THE DRAWINGS

Represented schematically.

DETAILED DESCRIPTION OF PREFERRED EMBODIMENTS

Figure 1:
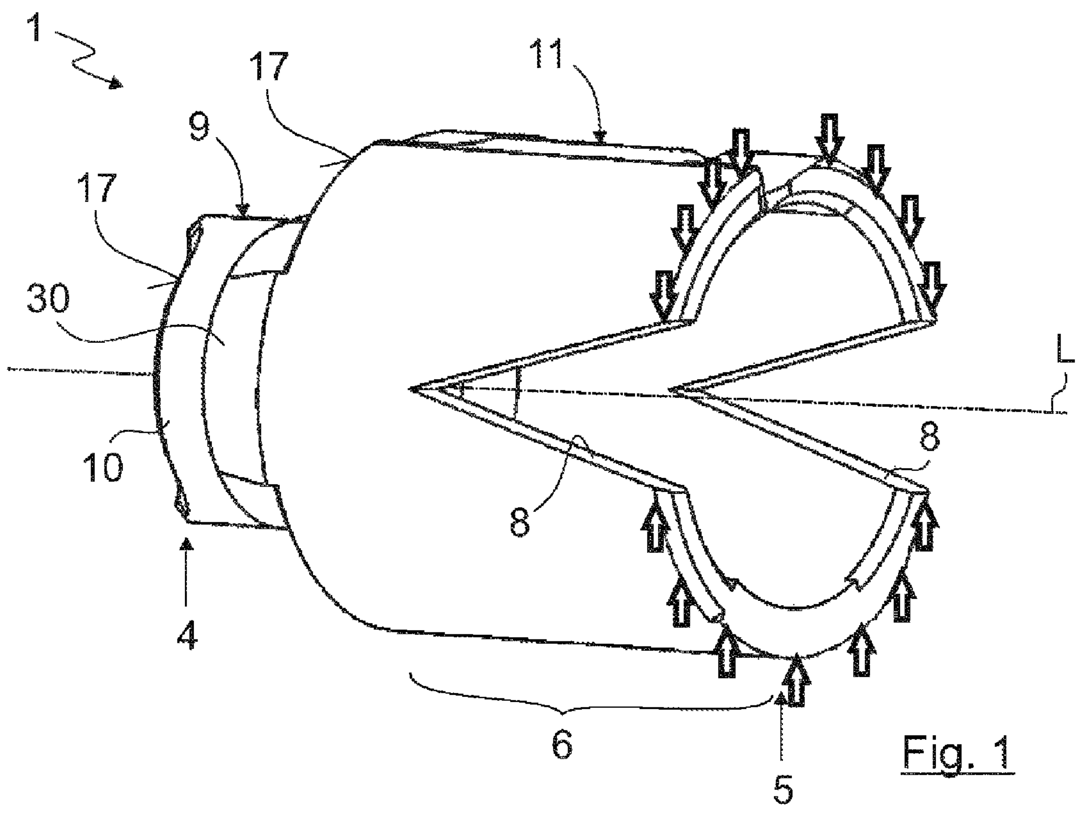
FIG. 1 shows a punched and bent part, preformed to produce a support sleeve with two support regions, in a perspective illustration.

FIG. 1 shows a punched and bent part, preformed to produce a support sleeve 1, for attachment to an outer conductor shield 2 (compare for example FIG. 5) of an electric cable 3. The support sleeve 1 has a connector-side end 4 and a cable-side end 5.

Figure 2:
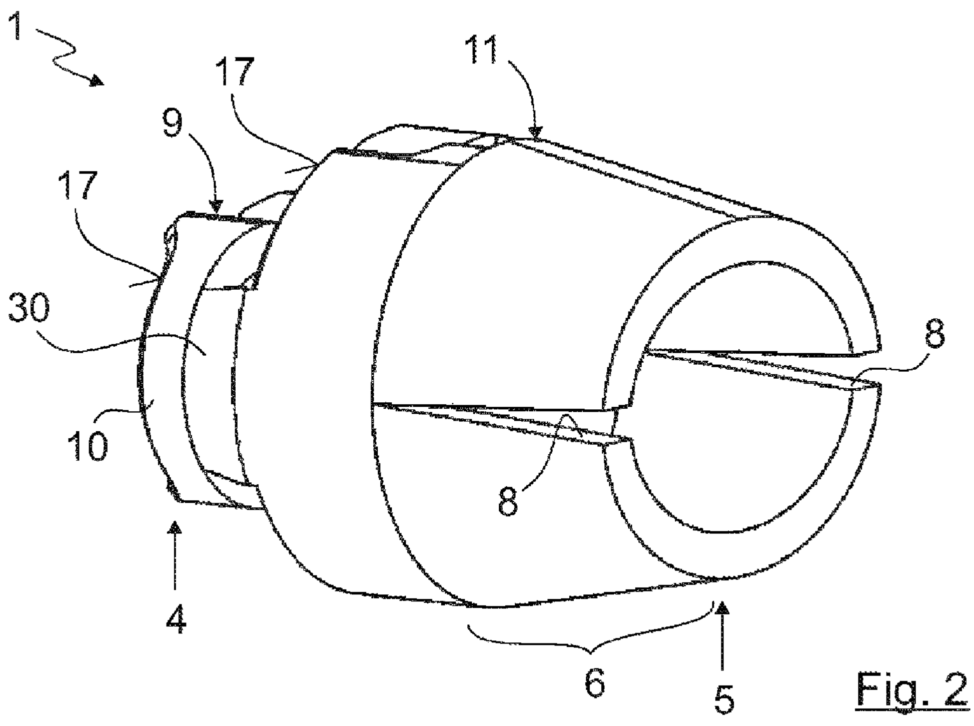
FIG. 2 shows the support sleeve of FIG. 1 after a crimping process in the region of the cable-side end in a perspective illustration.
Figure 3:
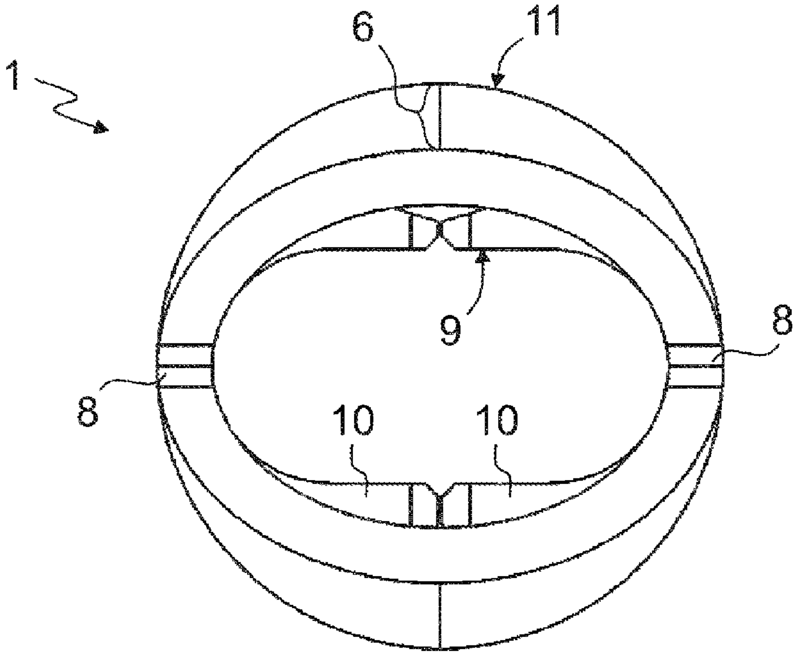
FIG. 3 shows the support sleeve of FIG. 2 in a plan view of the cable-side end.

The support sleeve 1 has a cable-side end portion 6, which is designed in such a way that it can be deformed by a deforming process, for example a crimping process below (indicated by arrows in FIG. 1), in such a way that, after the crimping process, the cable-side end portion 6 tapers in the direction of the cable-side end 5, as illustrated in FIG. 2. FIG. 3 shows a plan view of the cable-side end 5 of the support sleeve 1. In this case, the said crimping process can be provided in particular during the cable fabrication described below, preferably for attaching the support sleeve 1 to the outer conductor shield 2 of the electric cable 3, and/or during the attachment of an outer conductor element 7, described below, to the support sleeve 1.

In order to be able to generate the taper in the direction of the cable-side end 5, the cable-side end portion 6 of the support sleeve 1 has two incisions formed as notches 8, which, starting from the cable-side end 5, extend in the axial direction (along the center axis or longitudinal axis L) through the cable-side end portion 6. Any number of incisions or notches 8 can essentially be provided, possibly also only one incision or more than two incisions, for example three incisions, four incisions, five incisions or even more incisions. The cable-side end portion 6 of the support sleeve 1 can also be designed in the manner of a spring cage.

The cable-side end portion 6 of the support sleeve 1 extends over an axial length which corresponds to at least five percent (5%) of the total length of the support sleeve 1, preferably corresponds to at ten percent (10%) of the total length of the support sleeve 1, particularly preferably corresponds to at least twenty percent (20%) of the total length of the support sleeve 1, especially preferably corresponds to at least forty percent (40%) of the total length of the support sleeve 1, further preferably corresponds to at fifty percent (50%) of the total length of the support sleeve 1 and even further preferably corresponds to at least sixty percent (60%) of the total length of the support sleeve 1.

The cable-side end portion 6 of the support sleeve 1 can taper in the direction of the cable-side end 5 in such a way that the cable-side end 5 has a circular cross-section. Alternatively, an oval or elliptical cross-section can also be provided, for example, as illustrated in the exemplary embedment (compare in particular FIG. 3).

The support sleeve 1 illustrated in the exemplary embodiments of FIGS. 1 to 9 has two support regions 9, 11. A first support region 9 is provided, which is arranged adjacent to the connector-side end 4 and has two half shells 10, which are U-shaped in cross-section and are arranged with their openings opposite one another (compare in particular FIGS. 5 and 7). A second support region 11 is formed adjacent to the cable-side end 5 and has a circular or oval cross-section. The first support region 9 is connected to the second support region 11 by means of two axial webs 30. The first support region 9 can essentially also be omitted, as illustrated in the exemplary embodiments of FIGS. 10 and 11.

Figure 4:
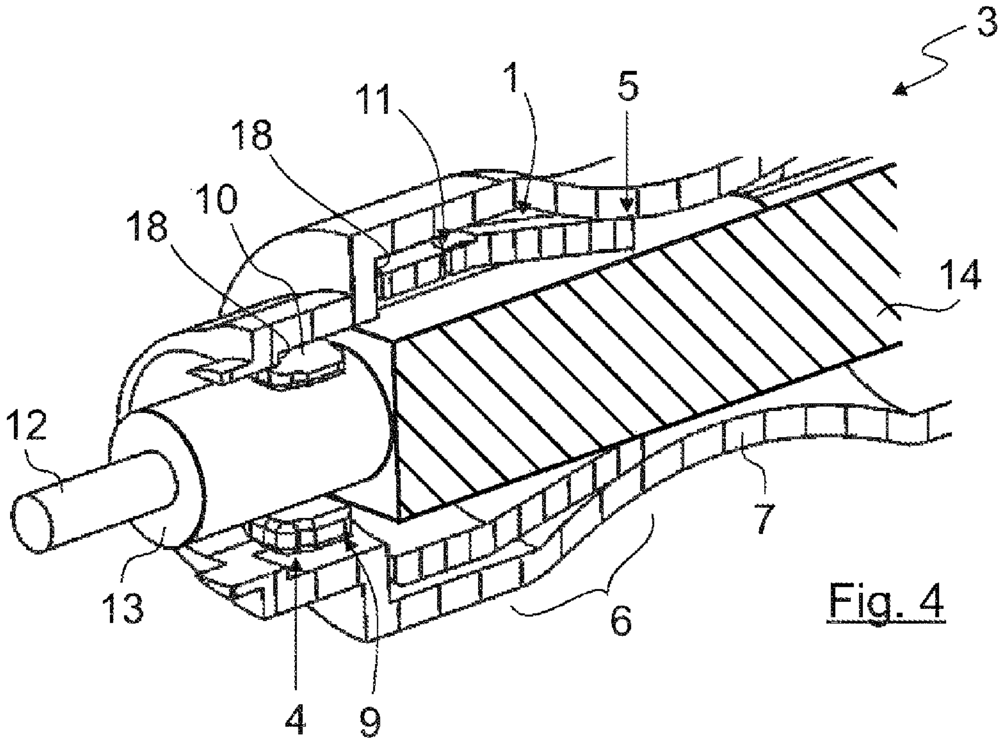
FIG. 4 shows a prefabricated electric cable with the support sleeve attached to an outer conductor shield according to FIG. 2 and an outer conductor element of an electrical connector, which is attached to the support sleeve, in a perspective longitudinal section.
Figure 5:
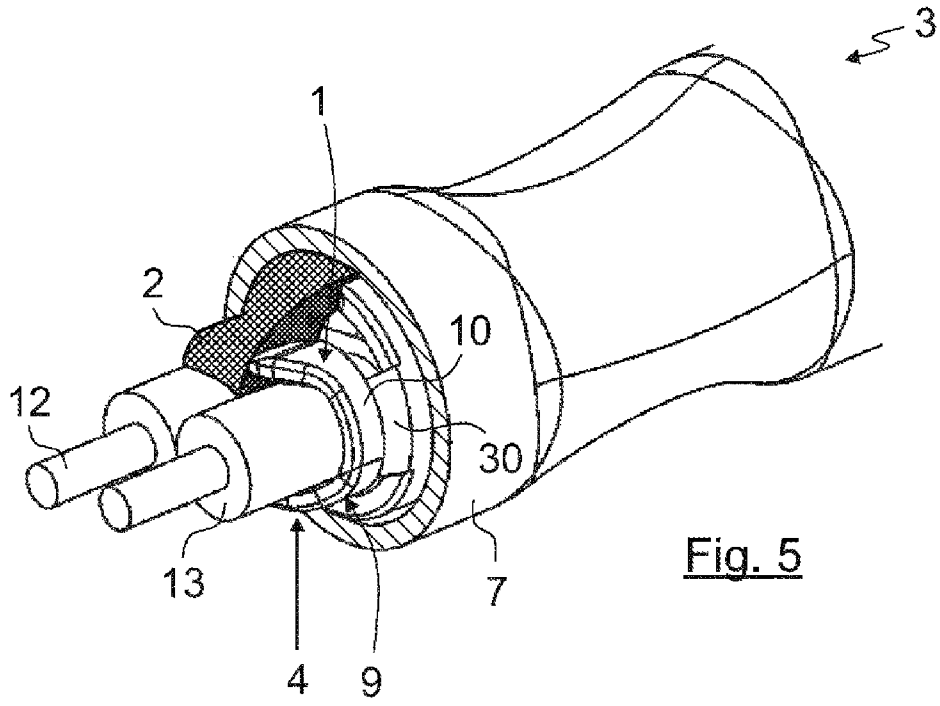
FIG. 5 shows the prefabricated electric cable of FIG. 4 in a perspective illustration with an outer conductor element in a partial section.

FIGS. 4 and 5 show a prefabricated electric cable 3. The electric cable 3 has, for example, two inner conductors 12 or cable wires (compare in particular FIGS. 5 to 7), which are each sheathed by a dielectric 13 and preferably extend through the electric cable 3 in a twisted manner in the axial direction. The inner conductors 12 equipped individually with the dielectrics 13 can optionally be routed together in an insulation material 14 (also referred to as a "filler"). The inner conductors insulated with their respective dielectric 13 are surrounded by a cable foil (also referred to as "shielding foil" and not illustrated in more detail), around which the outer conductor shield 2 in turn extends. The cable sheath 15 is arranged around the outer conductor shield 2 (compare FIG. 13). The illustrated prefabricated electric cable 3 is stripped in certain regions at the cable end to be processed, in order to enable access to the inner conductors 12 and the outer conductor shield 2 for the cable fabrication.

The prefabricated electric cable 3 has the support sleeve 1 attached to the outer conductor shield 2. The outer conductor shield 2 is preferably folded back over the support sleeve 1. The extent of the outer conductor shield 2 is indicated by way of example in FIG. 8, wherein the electric cable 3 is faded out for simplicity.

The prefabricated electric cable 3 furthermore has an outer conductor element 7 of an electric connector 16 (compare FIG. 3), which is attached, preferably crimped, to the support sleeve 1. As can be seen particularly clearly in FIGS. 8 and 9, the outer conductor element 7 has at least one stop region for at least one end-face stop 17 of the support sleeve 3. In the exemplary embodiment, the stop region is formed as an internal shoulder 18. Multiple shoulders 18 for multiple stops 17 of the support sleeve can also be provided, as shown. At least one web projecting into the interior of the outer conductor element 7 can essentially also be provided in order to form the at least one stop region. The support sleeve 1 can therefore abut against the shoulders 18 or against the stop region of the outer conductor element 7 with a form fit.

The outer conductor element 7 furthermore has a crimp region (indicated by means of two arrows in FIG. 8) for crimping the outer conductor element 7 to the cable-side end portion 6 of the support sleeve 1. In this case, the outer conductor shield 2 can be squeezed between the support sleeve 1 and the outer conductor element 7. The cable-side end portion 6 of the support sleeve 1 is preferably designed as a crimp region for attaching the support sleeve 1 to the outer conductor shield 2 and/or for attaching the outer conductor element 7 to the support sleeve 1.

As a result of the tapering design of the cable-side end portion 6 of the support sleeve 1, a sufficiently stable and electrically suitable connection between the outer conductor element 7 and the support sleeve 1 can also take place in the event of an (e.g. tolerance-related) imprecise positioning of a crimping tool.

Owing to the advantageous combination of the internal shoulder(s) 18 of the outer conductor element 7 and the tapering cable-side end portion 6 of the support sleeve 1, which advantageously cooperates with the crimp region of the outer conductor element 7, a form-fitting connection between the support sleeve 1 and the outer conductor element 7 can be produced overall, in which air pockets are advantageously prevented on the one hand and the outer conductor shield 2 advantageously extends between the outer conductor element 7 and the support sleeve 1 on the other. According to the invention, a particularly good mechanical connection and an optimized electrical connection, in particular without impedance jumps, can be provided.

Figure 6:
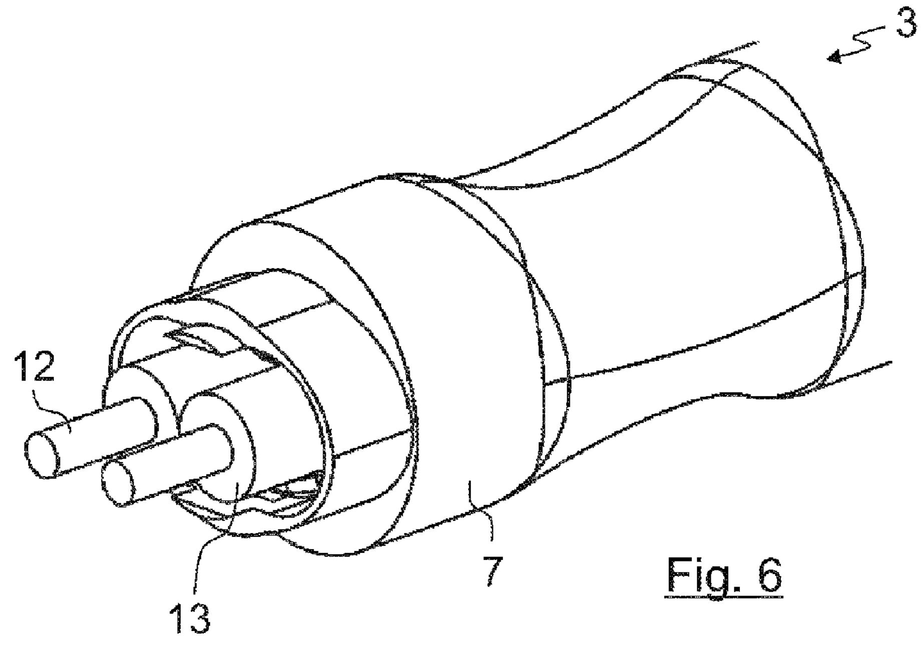
FIG. 6 shows the prefabricated electric cable of FIG. 4 in a perspective illustration.
Figure 7:
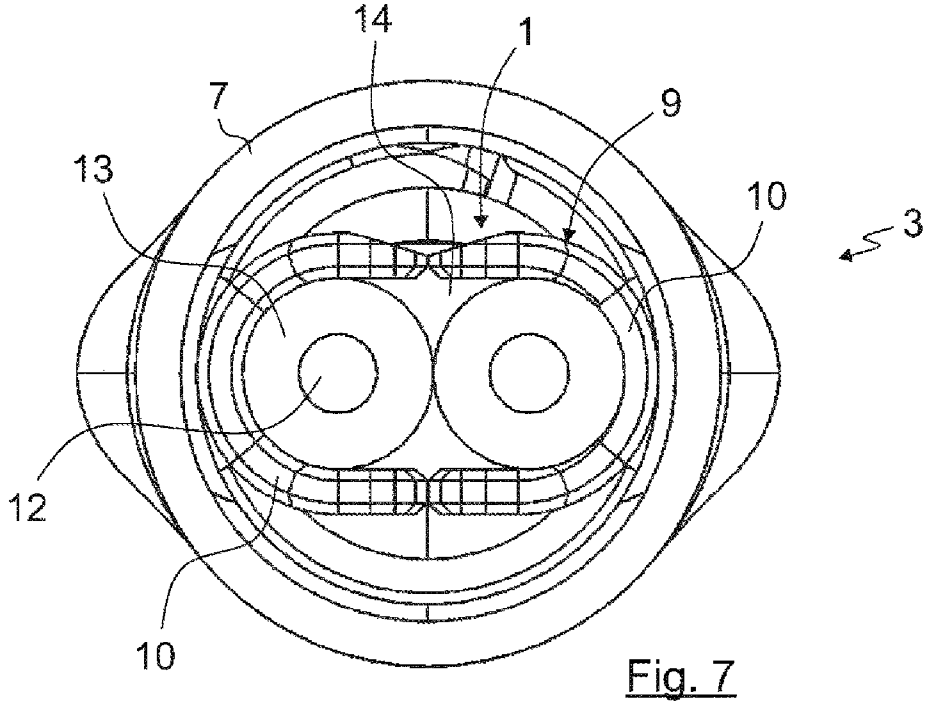
FIG. 7 shows the prefabricated electric cable of FIG. 4 in a plan view of the connector-side end of the support sleeve.
Figure 8:
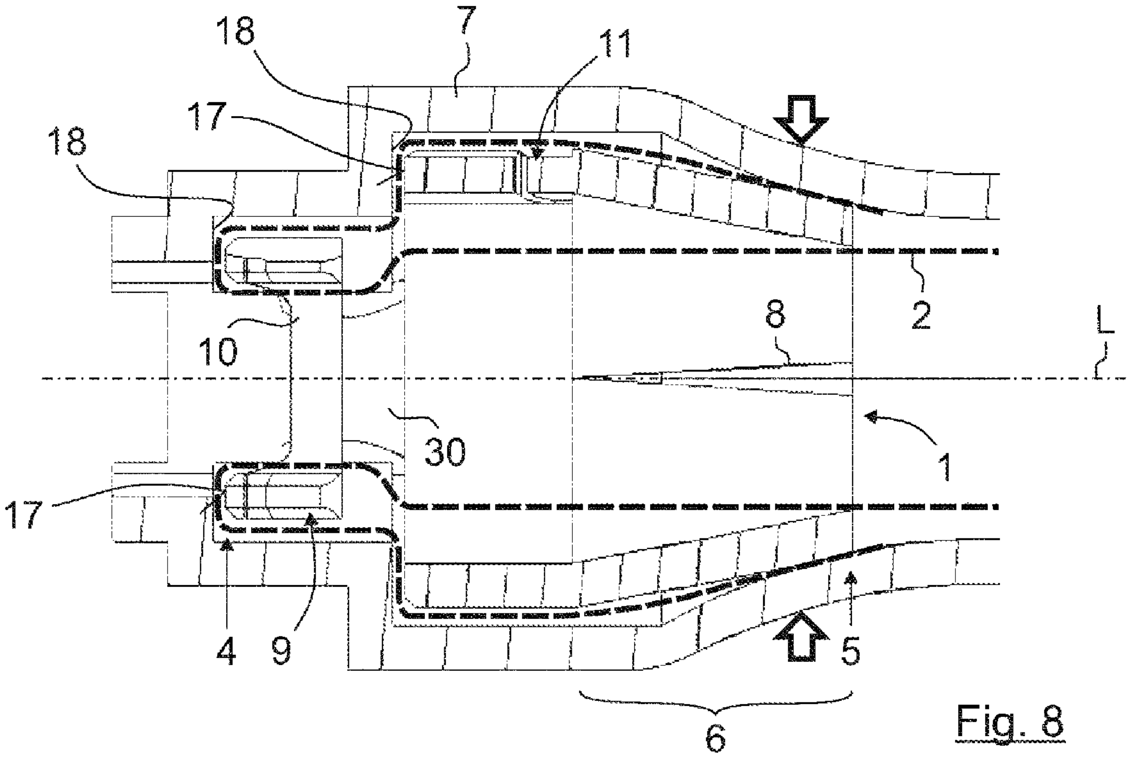
FIG. 8 shows the support sleeve and the outer conductor element of FIG. 4 in a lateral sectional illustration with the electric cable.
Figure 9:
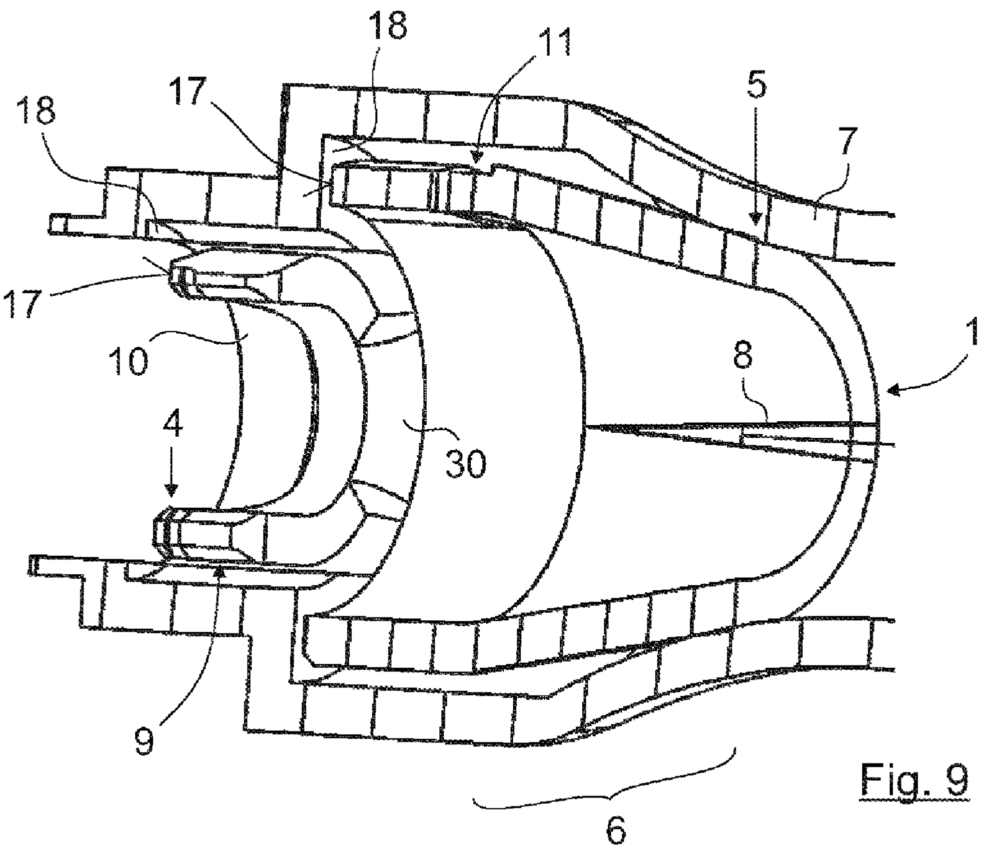
FIG. 9 shows the support sleeve and the outer conductor element of FIG. 8 in a perspective sectional illustration.

As can be seen in particular in FIGS. 4 to 6, the first support region 9 of the support sleeve 1 is particularly advantageously suitable for being crimped to the two inner conductors 12 of the electric cable 3, which have an "oblong" cross-sectional extent or an oval/elliptical extent. The second support region 11, on the other hand, can be advantageously suitable for connection to the predominantly circularly formed outer conductor element 7.

Figure 10:
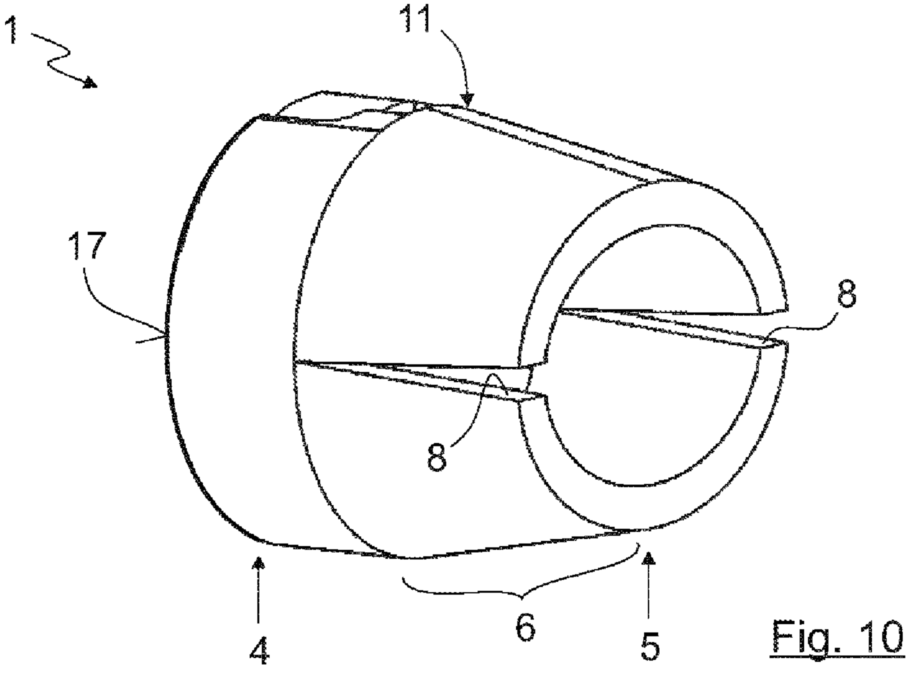
FIG. 10 shows a support sleeve according to a second embodiment of the invention with only one support region in a perspective illustration.
Figure 11:
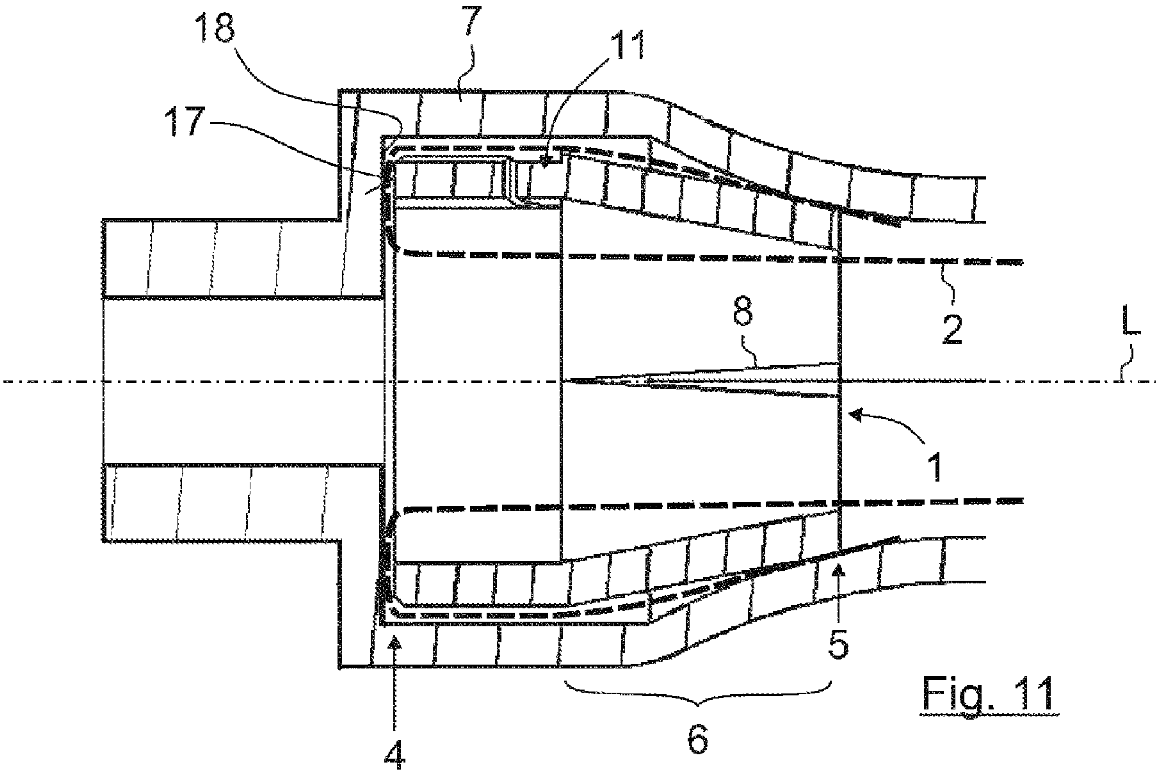
FIG. 11 shows the support sleeve of FIG. 10 in a mounted state within an outer conductor element without the electric cable in a lateral sectional illustration.

An alternative support sleeve 1, in which a first support region 9 is omitted, is illustrated in FIGS. 10 and 11. The invention is also advantageously suitable for use with a support sleeve 1 with only one support region 11. An exemplary extent of the outer conductor shield 2 is indicated in FIG. 11.

Figure 12:
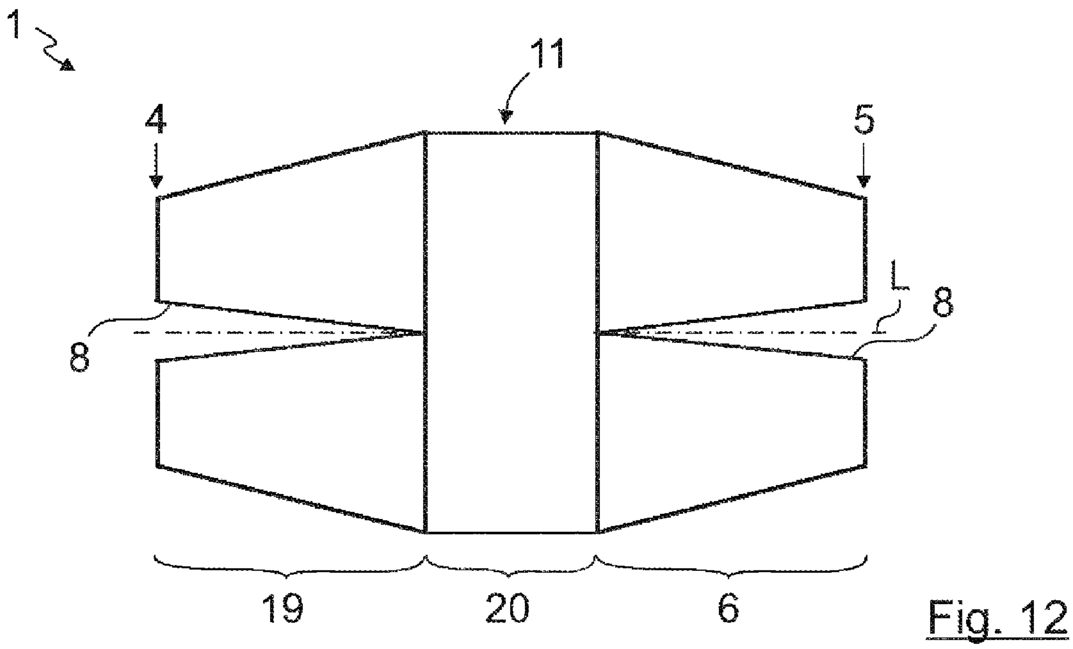
FIG. 12 shows a support sleeve according to a third embodiment of the invention with two conical end portions in a lateral view.

A further embodiment of an inventive support sleeve 1 is illustrated in FIG. 12. The support sleeve 1 shown in FIG. 12 has a connector-side end portion 19, which tapers in the direction of the connector-side end 4 of the support sleeve 1. A central portion 20 extends between the connector-side end portion 19 and the cable-side end portion 6. However, the two end portions 4, 19 can also be arranged adjacent to one another. A corresponding outer conductor element 7 can preferably have two crimp regions in order to be crimped to the cable-side end portion 6 and/or to the connector-side end portion 19 of the support sleeve 1. A suitable form fit between the outer conductor element 7 and the support sleeve 1 can thus be produced.

Figure 13:
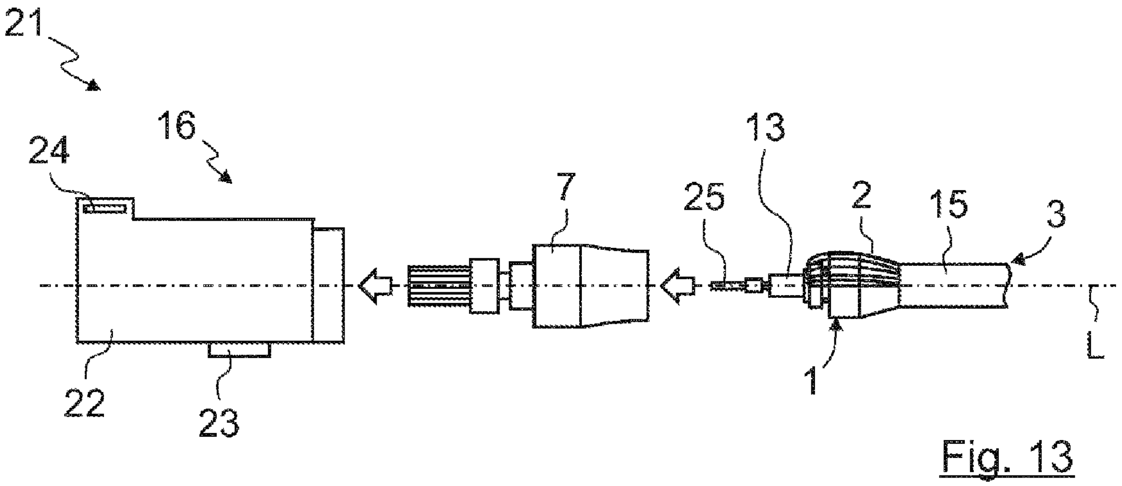
FIG. 13 shows an inventive connector arrangement.

FIG. 13 shows a connector arrangement 21, comprising the electric cable 3 and an electrical connector 16 to be connected to the illustrated cable end. The electrical connector 16 has a plastic housing (illustrated merely by way of example), in which the already described outer conductor element can be inserted and latched. To this end, a primary securing means (not illustrated) and optionally a secondary securing means 23 for locking the primary securing means can be provided. The plastic housing can have latching means 24 for latching to a complementary mating connector (not illustrated). The inner conductor(s) 12 of the electric cable 3 are connected, in particular crimped, to inner conductor contacts 25 of the connector 16. The already described support sleeve 1 is attached to the outer conductor shield 2 of the electric cable 3. The outer conductor shield 2 is furthermore folded back over the support sleeve 1 (only partially illustrated for better illustration).

Figure 14:
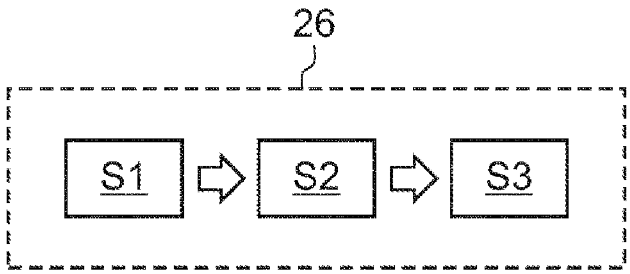
FIG. 14 shows an inventive method for fabricating an electric cable.

A method for fabricating an electric cable 3 within the context of the present invention is indicated in FIG. 14. According to a first method step S1, a support sleeve 1 having a connector-side end 4 and a cable-side end 5 is attached to the outer conductor shield 2 of an electric cable 3. According to a second method step S2, the outer conductor shield 2 can then be folded back over the support sleeve 1. According to a third method step S3, an outer conductor element 7 of an electrical connector 16 can then be pushed axially over the support sleeve 1 and crimped to the support sleeve 1.

Of course, further method steps (not illustrated) can also be provided during the fabrication of the electric cable 3.

The method can be executed as a computer program product with program code means on a control device 26 of an apparatus 27 for fabricating an electric cable 3.

Figure 15:
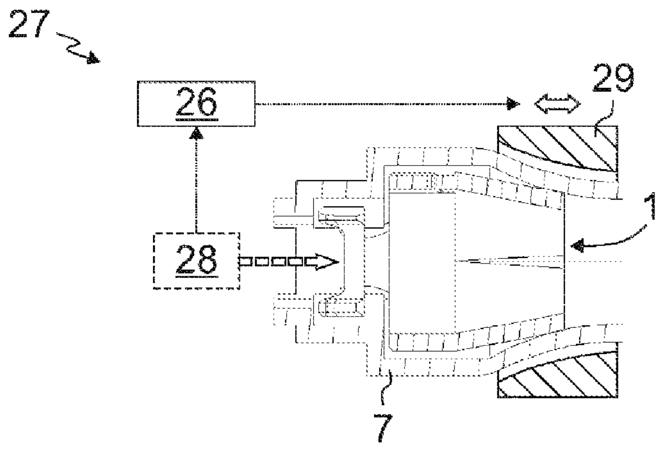
FIG. 15 shows an inventive apparatus for fabricating an electric cable.

An apparatus 27 for fabricating an electric cable 3 is illustrated in FIG. 15, which apparatus should be seen as merely exemplary and highly schematic. The apparatus 27 has a sensor device 28 for detecting the axial position of the support sleeve 1 arranged within the outer conductor element 7 of the electrical connector 16 and attached to the outer conductor shield 2 of the electric cable 3.

The apparatus 27 furthermore comprises a deforming tool (crimping tool 29 below), which can be positioned axially, and the control device 26 for determining an intended axial crimping position for the crimping tool 29. The control device 26 is preferably configured to determine the crimping position based on the axial position of the support sleeve 1, detected by means of the sensor device 28, in such a way that the outer conductor element 7 can be crimped to the support sleeve 1 by means of the crimping tool 29, at least in the region of a cable-side end portion 6 tapering in the direction of the cable-side end 5 of the support sleeve 1.

While the invention has been described with reference to various preferred embodiments, it should be understood by those skilled in the art that various changes may be made and equivalents substituted for elements thereof without departing from the scope of the invention. In addition, many modifications may be made to adapt to a particular situation or application of the invention without departing from the scope of the invention. Therefore, it is intended that the invention not be limited to the particular embodiments disclosed but rather, that the invention will include all embodiments falling within the scope of the appended claims, either literally or under the Doctrine of Equivalents.

What is claimed is:

1. An electric cable assembly, comprising:

an electric cable having at least one internal electrical conductor and an outer conductor shield;

an outer conductor element having an interior, the outer conductor element including at least one shoulder within the interior and a crimp region, the crimp region extending in an axial direction;

a support sleeve received within the interior of the outer conductor element, an end portion of the electric cable being received within the support sleeve, the support sleeve having a connector-side end and a cable-side end which are mutually separated from one another in the axial direction, at least a cable-side end portion of the support sleeve being tapered and underlying at least a portion of the crimp region of the outer conductor element, the support sleeve having an end-face stop, a first portion of the outer conductor shield being interposed between the end-face stop of the support sleeve and the shoulder of the outer conductor element; the end face-stop of the support sleeve being displaced axially toward the shoulder of the outer conductor element to electrically and mechanically fasten the first portion of the outer conductor shield between the end face-stop of the support sleeve and the shoulder of the outer conductor element as a result of applying a mechanical force to deform the crimp region of the outer conductor element.

2. An electric cable assembly as claimed in claim 1, wherein the outer conductor shield of the electric cable has a second portion which is interposed between the crimp region of the outer conductor element and the cable-side end portion of the support sleeve and wherein, as a further result of applying a mechanical force to deform the crimp region of the outer conductor element the second portion the outer conductor shield is squeezed between the crimp region of the outer conductor element and the cable-side end portion of the support sleeve to electrically and mechanically fasten the second portion of the outer conductor shield between the crimp region of the outer conductor element and the cable-side end portion of the support sleeve.

3. An electric cable assembly as claimed in claim 1, wherein the end-face stop abuts the outer conductor element to position the outer conductor element and the support sleeve with respect to one another in the axial direction.

4. An electric cable assembly as claimed in claim 1, wherein the outer conductor shield is folded back over the support sleeve.

5. A method for fabricating an electric cable assembly using an electric cable of the type having an outer conductor shield, said method comprising the steps of:

a) attaching a support sleeve to the outer conductor shield of the electric cable, the outer conductor shield being folded back over the support sleeve, the support sleeve having a connector-side end and a cable-side end which are mutually separated from one another along a longitudinal axis, the support sleeve having a tapered cable-side end portion which narrows progressively in an direction along the longitudinal axis which faces toward the cable-side end of the support sleeve;

b) pushing an outer conductor element of an electrical connector axially over the support sleeve, the outer conductor element including an interior cavity and a crimp region, the crimp region extending in the axial direction, the support sleeve being received in the interior cavity, the tapered cable-side end portion of the support sleeve being located closer to the cable-side end of the support sleeve than to the connector-side end of the support sleeve, the tapered cable-side end portion of the support sleeve underlying at least a portion of the crimp region of the outer conductor element, a portion of the outer conductor shield being interposed between the crimp region and the cable-side end portion of the support sleeve, and c) swaging the crimp region of the outer conductor element to the support sleeve, such that the outer conductor element is swaged to the support sleeve at least in the tapered cable-side end portion of the support sleeve underlying the crimp region and such that the portion of the outer conductor shield is clamped between the outer conductor element and the support sleeve.

6. An electric cable assembly, comprising:

an electric cable having at least one internal electrical conductor and an outer conductor shield;

an outer conductor element having an interior cavity and a crimp region, the crimp region extending along a longitudinal axis;

a support sleeve received within the interior cavity of the outer conductor element, an end portion of the electric cable being received within the support sleeve, the support sleeve having a connector-side end and a cable-side end which are mutually separated from one another along the longitudinal axis, the support sleeve having a tapered cable-side end portion which narrows progressively in a direction along the longitudinal axis which faces toward the cable-side end of the support sleeve, the tapered cable-side end portion of the support sleeve being located closer to the cable-side end of the support sleeve than to the connector-side end of the support sleeve, the tapered cable-side end portion of the support sleeve underlying at least a portion of the crimp region of the outer conductor element, the outer conductor element being attached to the support sleeve due to a crimping process applied to the crimp region of the outer conductor, a portion of the outer conductor shield of the electric cable being clamped between the crimp region of the outer conductor element and the tapered cable-side end portion of the support sleeve.

7. An electric cable assembly as claimed in claim 6, wherein the cable-side end portion of the support sleeve has at least one incision which extends in an axial direction from the cable-side end through the cable-side end portion.

8. An electric cable assembly as claimed in claim 6, wherein the support sleeve has a total length in an axial direction and the length of the cable-side end portion of the support sleeve in the axial direction is at least five percent of the total length of the support sleeve.

9. An electric cable assembly as claimed in claim 6, wherein the cable-side end portion of the support sleeve tapers such that that the cable-side end has a circular cross-section.

10. An electric cable assembly as claimed in claim 6, wherein the connector-side end has a connector-side end portion which tapers in an axial direction of the connector-side end, the axial direction of the connector-side end being a direction which is opposite the axial direction of the cable-side end.

11. An electric cable assembly as claimed in claim 6, wherein the support sleeve also has a first support region, the first support region being adjacent to the connector-side end, the first support region having two half shells, each of the half shells being substantially U-shaped in cross-section and having a respective opening, each respective opening being arranged opposite one another; the support sleeve also having a second support region, the second support region being adjacent to the cable-side end and having a circular cross-section.

12. An electric cable assembly as claimed in claim 6, wherein the outer conductor element further comprises at least one web which projects into the interior of the outer conductor element.

13. An electric cable assembly as claimed in claim 6, wherein the sleeve is formed by punching and bending and wherein the sleeve is so formed before being fastened to the outer conductor shield.

* * * * *